United States Patent

[11] 3,603,780

[72] Inventor Kenneth C. Lu
 134 York Dr., Piedmont, Calif. 94611
[21] Appl. No. 5,839
[22] Filed Jan. 26, 1970
[45] Patented Sept. 7, 1971
 Continuation-in-part of application Ser. No. 636,858, May 8, 1967, now abandoned.

[54] ARTIFICIAL TREE STRUCTURE
 5 Claims, 8 Drawing Figs.
[52] U.S. Cl.......................................... 240/10 R,
 161/24, 240/10 T
[51] Int. Cl........................................A47g 33/16,
 A47g 33/06
[50] Field of Search............................ 240/10,
 10.1, 36; 161/22, 23, 24

[56] References Cited
 UNITED STATES PATENTS
| | | | |
|---|---|---|---|
| 2,708,324 | 5/1955 | Wedden | 240/10 T (X) |
| 2,826,845 | 3/1958 | Warren | 161/24 |
| 3,115,435 | 12/1963 | Abramson | 161/24 |
| 3,159,523 | 12/1964 | Abramson | 161/24 |

FOREIGN PATENTS
| | | | |
|---|---|---|---|
| 692,999 | 8/1964 | Canada | 161/22 |

Primary Examiner—Samuel S. Matthews
Assistant Examiner—Robert P. Greiner
Attorney—Gregg & Hendricson ABSTRACT: Improved structure for an artificial tree such as a Christmas tree having a hollow trunk with hollow sleeved limbs pivotally mounted on the trunk at decreasing distances therefrom toward the tree top for folding of the structure into minimized volume. Electrical wiring extending from limbs through the tree trunk provides an integral lighting system and adds structural rigidity while limb covers provide maximized realistic appearance.

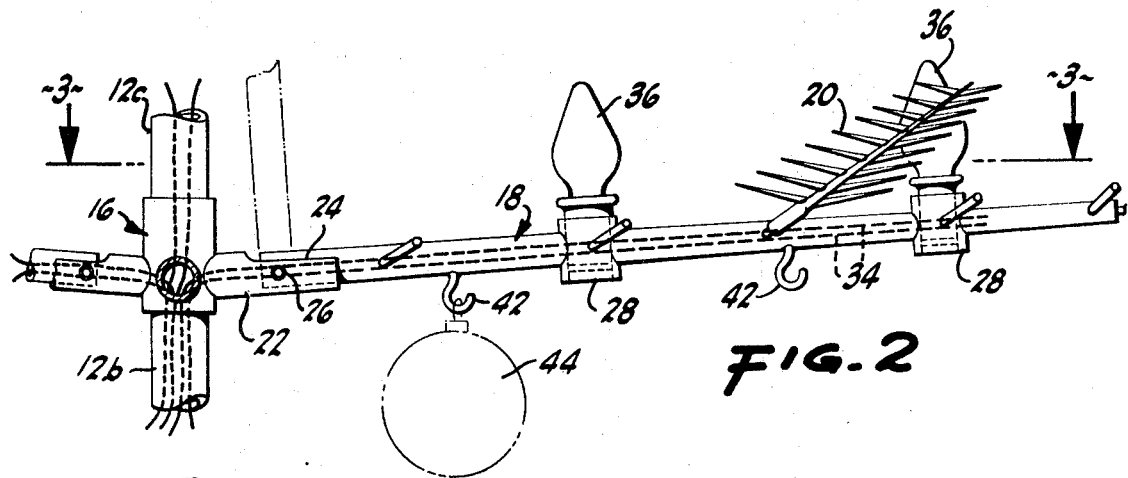
FIG.2
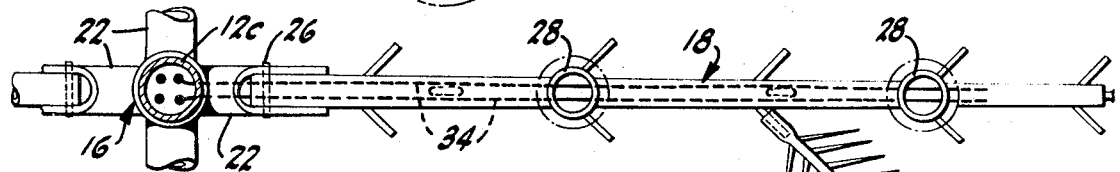
FIG.3
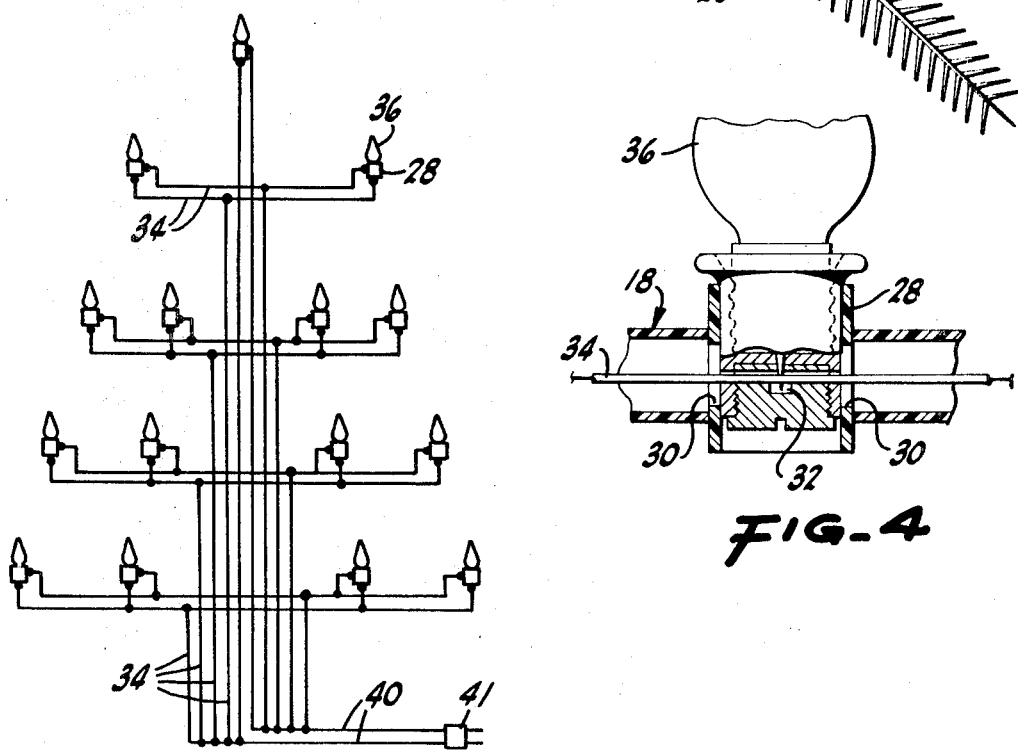
FIG.4
FIG.5
INVENTOR
KENNETH C. LU
By Gregg & Hendricson
ATTORNEYS

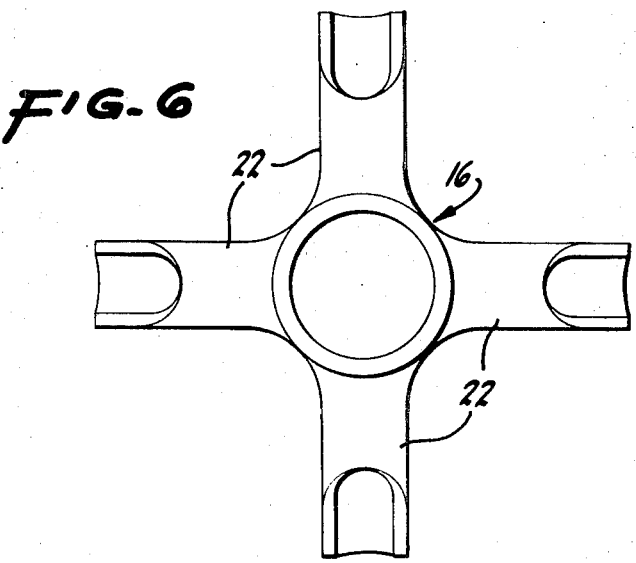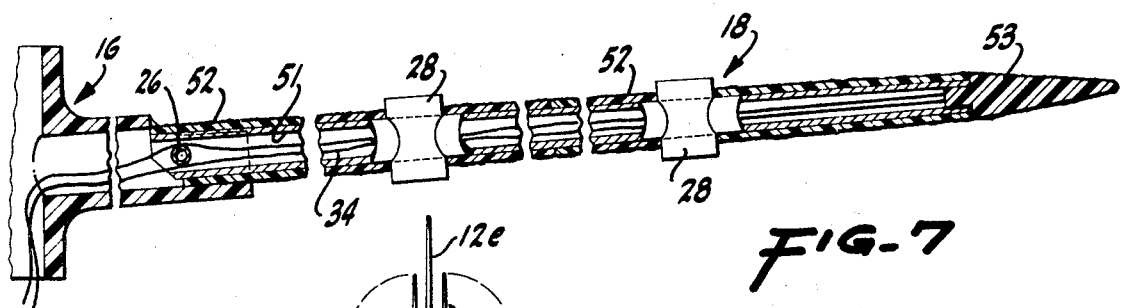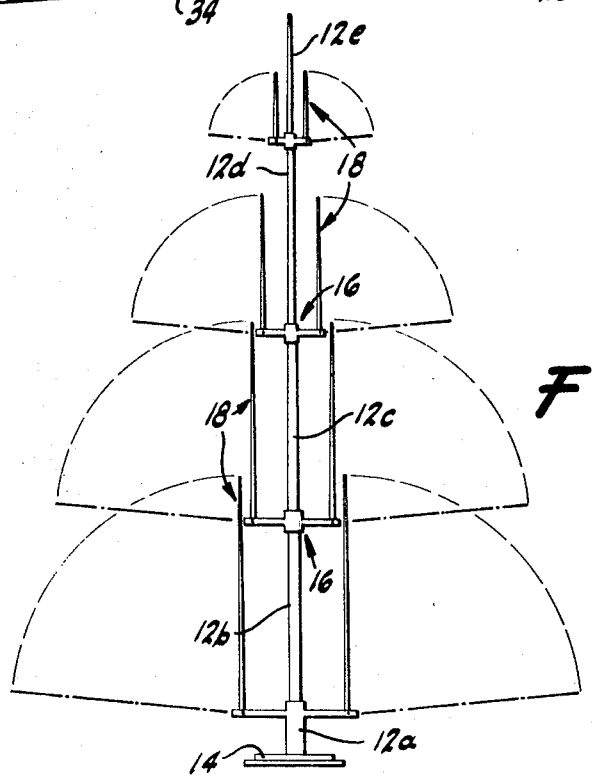

3,603,780

ARTIFICIAL TREE STRUCTURE

This application is a continuation-in-part of my prior copending Pat. application Ser. No. 636,858 filed in the U.S. Patent Office on May 8, 1967 and now abandoned.

BACKGROUND OF INVENTION

There have been developed a variety of different structures for simulated trees and at least certain of these have been commercialized as artificial Christmas trees. It is, for example, known to form artificial trees of lightweight metal tubing with attached simulated springs and many commercially available units are so constructed. It is also known to form artificial trees of various types of plastic. Considering artificial Christmas trees somewhat further, it is noted that same should be as realistic as possible so as to closely resemble the fir, spruce, or the like. Such an artificial tree should also be sturdy, lightweight and readily folded into compact form for storage, as well as readily admitting or incorporating means for decoration and lighting. In this latter respect, metal artificial trees are considered unsuited for the stringing of Christmas tree lighting sets thereon because of the possible danger of short circuits to the tree itself.

Folding artificial Christmas tree structures are shown, for example, in U.S. Pat. Nos. 1,694,974 and 2,708,324 while artificial Christmas trees incorporating lighting systems are shown for example, in U.S. Pat. Nos. 1,656,148 and 1,677,972 as well as German Pat. No. 929,872. A more recent improvement in this field is shown in Canadian Pat. No. 692,999.

One of the difficulties encountered by prior art workers in the field is the relative incompatability of realism in an artificial Christmas tree with the requirement for compact folding and ready handling as well as integral lighting. Even though prior art artificial Christmas trees have provided for the folding of limbs, it will be appreciated that small side branches on limbs necessary to provide the fullness for realism interfere with each other in any folding operation. Thus prior art artificial Christmas trees of the folding limb type have an inverted V configuration but in folded condition have a V configuration with but little decrease in overall volume.

SUMMARY OF INVENTION

The present invention provides an improved structure for an artificial tree having a highly improved folding characteristic while at the same time incorporating an integral lighting system. The limbs of each whorl are pivotally mounted at the same distance from the trunk but the distance outward from the trunk for pivoting of the limbs of each whorl decrease toward the top of the tree. This then provides for minimum interference between the limbs and side branches thereof so that the tree may be compactly folded into a minimum volume.

There is additionally provided by the present invention an integral lighting system energized by wires extending through the tree trunk and limbs into permanent engagement with light bulb sockets formed in the limbs. Not only is this integral lighting system advantageous for the intended purpose thereof but, furthermore, the wiring of the system is herein employed to impart rigidity to the tree itself. One of the problems encountered in the construction of an artificial Christmas tree or the like is the minimization of weight with maximization of structural rigidity. The present invention employs hollow, generally tubular members for trunk and limbs with electrical wiring disposed therein and, in accordance with the present invention, this insulated interior wiring is tensioned between tree base and the various termini thereof so as to add structural strength to the thin-walled hollow members.

There is further provided by the present invention that the individual limbs extending outwardly from the trunk shall be formed as thin-walled metal tubes of tapering diameter with plastic sleeves fitting thereover. Structural strength is provided by the inner metal tubing and realistic appearance is attained by the use of segmented generally cylindrical covers or sleeves formed of plastic that may then be molded as desired.

A further feature of the present invention is found in the structure of the limb pivoting portion of the tree. Cast members are utilized for this purpose and the prior art difficulties of weakened structure at the joinder of limb and trunk is overcome thereby.

DESCRIPTION OF FIGURES

The present invention is illustrated as to particular preferred embodiments thereof in the accompanying drawings wherein:

FIG. 2 is a partial elevational view showing the connection of a limb and the trunk;

FIG. 3 is a partial sectional view in plan taken in the plane 3—3 of FIG. 2;

FIG. 4 is a partial sectional view taken in the plane 4—4 of FIG. 3;

FIG. 5 is a wiring diagram of the self contained lighting system of the invention;

FIG. 6 is a plan view of a trunk coupling member;

FIG. 7 is a partial sectional view taken longitudinally through a preferred embodiment of a limb structure of the artificial tree; and FIG. 8 is a schematic illustration of the artificial tree of FIG. 1 in folded condition.

DESCRIPTION OF PREFERRED EMBODIMENTS

Figure 1:
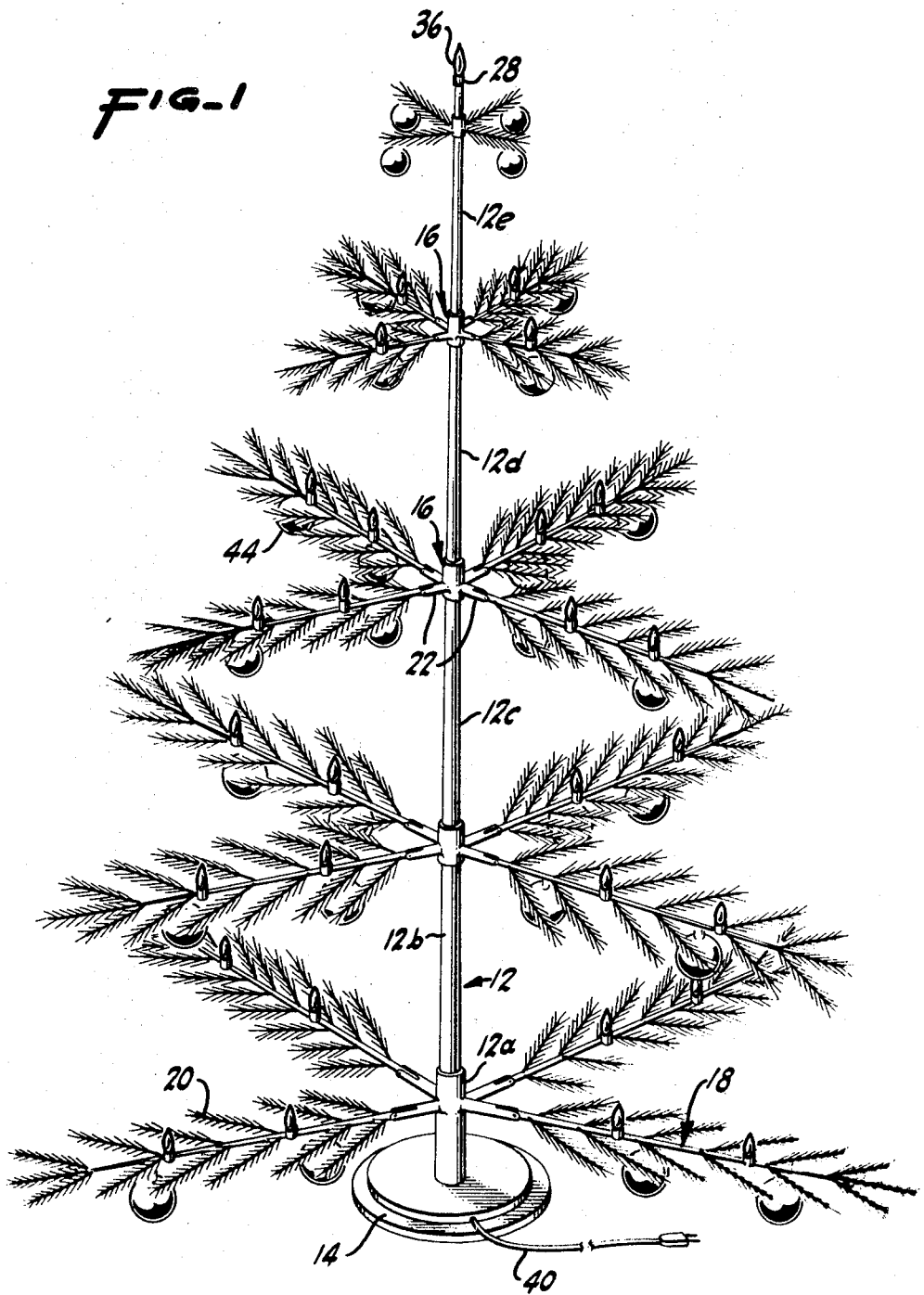
FIG. 1 is a perspective view of an unfolded artificial tree in accordance with my invention.

Referring now to FIG. 1 there will be seen to be shown an artificial tree structure 10 in accordance with the present invention including a trunk 12 formed of relatively rigid tubular material such as plastic or metal extending vertically upward from a substantial supporting base 14. Preferably the trunk is formed in sections with tubular members of graduated sizes to achieve the natural effect of a decrease in diameter toward the top of the tree. For example, the lowest section 12a is secured to the base 14 and telescopically receives the lower end of the section 12b. The sections are preferably permanently secured together and sequentially smaller sections 12c, 12d and 12e are united as by securing them to successive hubs or coupling members 16 on which are carried a plurality of laterally extending limbs 18 from which, in turn, extend branches 20 of suitable plastic material made to simulate the branches of a tree.

Referring now to to FIGS. 2, 3 and 4 there is shown a hub or coupling member 16 between adjacent sections 12b and 12c of the trunk and in which the trunk sections are telescopically received and secured in place as by bonding. Extending from the central portion of the coupling sections 16 are integral tubular or cylindrical mounts 22 as best seen in FIG. 6. This coupling section 16 is formed as a single integral unit as by casting and includes fillets at the juncture of the central vertical tubular portion and the laterally extending cylindrical portions 22, as shown, in order to minimize the loss of strength necessarily involved in the inclusion of openings laterally through the central portion. Each of the cylindrical extension of the coupling section are the same and considering the single extension to the right in FIGS. 2 and 3 it will be noted that the upper portion of same is cut away to form a concave recess or receptacle 24. The inner end of the limb 18 is then pivotally mounted on the connector 22 as by means of a pivot pin 26 extending through the inner end of the limb and across the concave receptacle 24. Hence the limb may be pivoted upwardly toward the axis of the trunk to the position shown in phantom in FIG. 2 but when pivoted downwardly the limb is limited by engagement with the bottom of the receptacle so as to extend in the manner shown in FIG. 2. It will thus be seen that the receptacle forms a positive stop to locate the limb in its desired position laterally of the trunk.

It is to be particularly noted that the cylindrical projections or connectors of the coupling members 16 differ in length between separate coupling members. While the pivot points for each limb at any particular vertical location are the same distance from the trunk, it will be clearly seen from FIG. 1 that the pivot points of the limbs are spaced further from the trunk at the bottom of the tree than at the top and this distance progressively from the bottom of the tree toward the top. Consequently, the present invention provides for folding of the tree into a compact mass so as to occupy a minimum volume. This is clearly illustrated in FIG. 8 wherein the artificial tree structure of the present invention is illustrated in folded condition. In order to truly simulate a tree there is provided in the present invention an abundance of foliage in the form of limbs and branches therefrom. However, this militates against compact folding. Any attempt to fold the limbs upwardly from adjacent the trunk will necessarily result in a V-shaped folded unit because of interference between the limbs and branches in folded condition. The present invention, however, provides for pivoting of the limbs upwardly from decreasing distances from the trunk toward the top of the tree so that there is attained a minimized folded volume by the tree.

The interiors of the trunk and limbs are in communication through the coupling members 16 and the cylindrical extensions or mounts 22 thereof. Electrical conductors 34 are strung through the trunk and limbs to energize a self contained lighting system for the tree that is highly advantageous for Christmas tree structures. A plurality of electrical sockets 28 extend through the limbs at spaced points therealong and may, for example, be formed in the manner shown in FIG. 4 with side openings at which limb sections are joined. Preferably the sockets are of a conventional type that includes means 32 for piercing the electrical conductors 34 to bring the socket into electrical communication therewith for illumination of a bulb 36 placed in the socket. As shown in FIGS. 1 and 5, the self-contained lighting system may include a light socket 28 at the top of the trunk and a plurality of sockets spaced along each limb, all of which are preferably electrically connected in parallel by the conductors 34. Parallel connection is advantageous not only for the obvious reason of continued bulb energization upon a single bulb failure but also to increase the number of conductors lower down the trunk to thus fill the trunk for additional strength. The conductors 34 are reduced in number to two at the base 14 and are there connected to the base, although electrically insulated therefrom. Naturally the conductors each are insulated and they are tensioned in connection to the base so as to place the trunk and limbs in compression and thus impart additional structural strength thereto and reduce the tendency thereof to bend or sag. A plug 41 is attached to the end of the pair of conductors 40 extending from the base 14 for engagement with a wall outlet to energize the lighting system.

As an additional feature of my invention, I provide a plurality of hooks 42 forming a part of and depending from the bottoms of the limbs 18 (FIG. 2) as readily available means for suspending ornamental balls 44 or the like.

The present invention may also include a covering on the limbs to improve structural rigidity while at the same time improving reality of the structure. Referring to FIG. 7 there will be seen to be shown a limb 18 which in this instance includes a central thin-walled metal tube 51 which is pivotally mounted on the coupling member 16 as described above. A plurality of contiguous plastic sleeves 52 are slipped over the limb tube 51 as shown. Particularly in the case of long limbs this structure provides structural strength with realistic appearance. An end piece 53 of plastic fits the end of the tube 51 as shown. Particularly in the case of long limbs this structure provides structural strength with realistic appearance. An end piece 53 of plastic fits the end of the tube 51 to hold the sleeves in place and the inner sleeve is cut away to accommodate the pivot mounting as shown. The tube 51 may be replaced by a metal bar or rod with wiring alongside within the sleeves.

There is also shown in FIG. 7 the utilization of the electrical conductors to impart additional rigidity to the limb. The conductors 34 are anchored to the end piece 53 of the limb and are drawn tightly through the coupling member 16 down the trunk into ultimate connection to the base 14. This tensions the limb tube 51 to thus improve the structural rigidity thereof.

It will be appreciated that the artificial tree structure of the present invention is highly advantageous in folding compactly into a minimum volume while the same time exhibiting a remarkable realism and exceptional structural strength both in coupling members and trunk and limbs. Such attributes commend the structure to widespread use.

I claim:

1. An artificial tree structure comprising
  a plurality of tubular trunk members with each including a coupling member having a vertical tubular portion with integral lateral cylindrical extensions communicating with the tubular portion,
  said trunk members being connected end-to-end to form a continuous single tree trunk, the cylindrical extensions of said coupling members decreasing in length toward the top of the tree trunk,
  a plurality of tubular limbs pivotally mounted one on each coupling member extension for folding upwardly toward the trunk, the distance between the trunk and the pivot point of the limbs decreasing toward the top of the tree trunk for compact folding of the structure,
  electrical conductors extending to at least certain of said limbs and through the trunk via said coupling members, and
  light sockets on said limbs with means extending into the limbs into electrical connection with said conductors.

2. The tree structure of claim 1 further defined by said electrical conductors being attached to the limbs adjacent the outer ends thereof and extending in tension through the limbs ans trunk into attachment with the trunk at the bottom thereof for maintaining the limbs and trunk in compression.

3. The tree structure of claim 1 further defined by said limbs each including a substantially rigid central hollow tube and a plurality of contiguous molded plastic sleeves disposed on the tube and maintained thereon by an end piece closing the outer end of the tube.

4. The tree structure of claim 1 further defined by the pivotal mounting of said limbs including an upwardly facing concave receptacle at the end of each coupling member extension, the inner end of each limb normally nesting in a receptacle, and a pivot pin extending ng across the receptacle through the inner end of the limb therein.

5. The tree structure of claim 1 further defined by said trunk increasing in diameter toward the bottom thereof and said conductors connecting said sockets in parallel to thus include an increasing number of wires in the trunk toward the bottom thereof, said wires filling said trunk in tightly packed relation therein for connecting the tree trunk members into a single continuous trunk of substantial structural strength and limited flexibility in the upper portion thereof.